United States Patent [19]
Tanaka et al.

[11] Patent Number: 4,669,750
[45] Date of Patent: Jun. 2, 1987

[54] VEHICLE SUSPENSION APPARATUS

[75] Inventors: Tadao Tanaka; Mitsuhiko Harara, both of Okazaki; Tasutaka Taniguchi; Masanaga Suzumura, both of Nagoya; Shozo Takizawa, Okazaki; Naotake Kumagai, Aichi; Minoru Tatemoto, Okazaki, all of Japan

[73] Assignee: Mitsubishi Jidosha Kogyo Kabushiki Kaisha, Tokyo, Japan

[21] Appl. No.: 765,868

[22] Filed: Aug. 13, 1985

[30] Foreign Application Priority Data

Aug. 21, 1984 [JP] Japan .................... 59-172377
Aug. 21, 1984 [JP] Japan .................... 59-172378
Aug. 21, 1984 [JP] Japan .................... 59-125869[U]
Aug. 21, 1984 [JP] Japan .................... 59-125870[U]
Dec. 27, 1984 [JP] Japan .................... 59-274047

[51] Int. Cl.$^4$ .................................... B60G 17/00
[52] U.S. Cl. ................................................ 280/707
[58] Field of Search ............... 280/707, 708, 6 H, 703, 280/DIG. 1; 188/299

[56] References Cited

U.S. PATENT DOCUMENTS 4,162,083  7/1979  Zabler et al. ............ 280/703
4,483,409  11/1984 Fun ........................... 280/703

FOREIGN PATENT DOCUMENTS 53-26021  3/1978  Japan .
110520    7/1982  Japan .................... 280/707
49503     3/1983  Japan .................... 280/707

OTHER PUBLICATIONS

Yokoya, Y. et al., "Toyota Electronic Modulated Suspension, (TEMS) System for the 1982 Soarer" Society of Automotive Engineers Technical Paper No. 840341.
Mizuguchi, M. et al., "Chassis Electronic Control Systems for the Mitsubishi 1984 Galant," Society of Automotive Engineers Technical Paper No. 840258.

Primary Examiner—John J. Love
Assistant Examiner—Karin L. Ferriter
Attorney, Agent, or Firm—Hedman, Gibson, Costigan & Hoare

[57] ABSTRACT

A vehicle suspension apparatus has air spring chamber provided at a suspension unit for supporting a rear wheel, air supply means for supplying air to the air spring chamber of the suspension unit for supporting the rear wheel through supply opening and closing valve, air exhaust means for exhausting air from the air spring means of the suspension unit for supporting the rear wheel, a parking brake sensor for detecting the operated state of a parking brake, and a shift position detecting sensor for detecting the shift position of an automatic transmission having a fluid drive unit for transmitting drive power to wheels. The parking brake sensor detects whether or not the parking brake is engaged. The shift position detecting sensor detects whether or not the shift position of the automatic transmission is operated from any of parking position (P) and neutral position (N) to running position (D, L, 2) to raise the vehicle height of the rear wheel side to supply air to the air spring chamber of the rear wheel side. The fact that the shifting position of the automatic transmission is operated from either the parking position (P) or the neutral position (N) to the running position (R) is detected to exhaust air from the air spring chamber of the rear wheel side to lower the vehicle height of the rear wheel.

16 Claims, 19 Drawing Figures

FIG. 4

| VALVE NO. | 32 | 223 | 273 | 224 | 274 | 242 | 221 | 271 | 222 | 272 | 241 | 30 |
|---|---|---|---|---|---|---|---|---|---|---|---|---|
| MODE / NAME | SELECTION OF EX. PATH | FL SUP. | FL EX. | FR SUP. | FR EX. | FR & FL COMMUNICATE | RL SUP. | RL EX. | RR SUP. | RR EX. | RR & RL COMMUNICATE | SELECTION OF SUP. PATH |
| NORMAL | X | X | X | X | X | O | X | X | X | X | O | X |
| HEIGHT CONT. — F UP | X | O | X | O | X | O | X | X | X | X | O | X |
| HEIGHT CONT. — R UP | X | X | X | X | X | O | O | X | O | X | O | X |
| HEIGHT CONT. — F & R UP | X | O | X | O | X | O | O | X | O | X | O | X |
| HEIGHT CONT. — F DOWN | X | X | O | X | O | O | X | X | X | X | O | X |
| HEIGHT CONT. — R DOWN | X | X | X | X | X | O | X | O | X | O | O | X |
| HEIGHT CONT. — F & R DOWN | X | X | O | X | O | O | X | O | X | O | O | X |
| L. ROLL CONT. — START | O | O | X | X | O | X | O | X | X | O | X | O |
| L. ROLL CONT. — HOLD | O | X | X | X | X | X | X | X | X | X | X | O |
| L. ROLL CONT. — RETURN | X | X | X | X | X | O | X | X | X | X | O | X |
| R. ROLL CONT. — START | O | X | O | O | X | X | X | O | O | X | X | O |
| R. ROLL CONT. — HOLD | O | X | X | X | X | X | X | X | X | X | X | O |
| R. ROLL CONT. — RETURN | X | X | X | X | X | O | X | X | X | X | O | X |
| NOSE DIVE CONT. — START | O | O | X | O | X | X | X | O | X | O | X | O |
| NOSE DIVE CONT. — HOLD | O | X | X | X | X | X | X | X | X | X | X | O |
| NOSE DIVE CONT. — RETURN | O | X | O | X | O | X | O | X | O | X | X | O |
| SQUAT CONT. — START | O | X | O | X | O | X | O | X | O | X | X | O |
| SQUAT CONT. — HOLD | O | X | X | X | X | X | X | X | X | X | X | O |
| SQUAT CONT. — RETURN | O | O | X | O | X | X | X | O | X | O | X | O |

FIG. 12

| | NAME | FR | FL | RR | RL | F.EX | R.EX | A.Ex | F.Sup | R.Sup | C.V |
|---|---|---|---|---|---|---|---|---|---|---|---|
| | VALVE NO. | 122 | 123 | 126 | 127 | 128 | 130 | 132 | 120f | 120r | 119 |
| POSITION CONTROL | RIGHT-TURN | | ○ | | ○ | ○ | ○ | | ○ | ○ | |
| | HOLD | | ○ | | ○ | | | | | | |
| | LEFT-TURN | ○ | | ○ | | ○ | ○ | | ○ | ○ | |
| | HOLD | ○ | | ○ | | | | | | | |
| | FRONT UP | ○ | ○ | | | | | | ○ | | |
| | ↑ DOWN | | | | | ○ | | | | | |
| | REAR UP | | | ○ | ○ | | | | | ○ | |
| | ↑ DOWN | | | | | | ○ | | | | |
| | F & R UP | ○ | ○ | ○ | ○ | | | | ○ | ○ | |
| | ↑ DOWN | | | | | ○ | ○ | | | | |
| | F.UP-R.DOWN | ○ | ○ | | | | ○ | | ○ | | |
| | R.UP-F.DOWN | | | ○ | ○ | ○ | | | | ○ | |
| HEIGHT CONTROL | FRONT UP | ○ | ○ | | | | | | ○ | | ○ |
| | ↑ DOWN | | | ○ | ○ | | | ○ | | | |
| | REAR UP | | | ○ | ○ | | | | | ○ | ○ |
| | ↑ DOWN | ○ | ○ | | | | | ○ | | | |
| | F & R UP | ○ | ○ | ○ | ○ | | | | ○ | ○ | |
| | ↑ DOWN | | | | | | | ○ | | | |
| | F.UP-R.DOWN | ○ | ○ | | | | | ○ | ○ | | ○ |
| | R.UP-F.DOWN | | | ○ | ○ | | | ○ | | ○ | ○ |

VEHICLE SUSPENSION APPARATUS

BACKGROUND OF THE INVENTION

The present invention relates to a vehicle having an automatic transmission, including a fluid drive unit for transmitting a drive force to the wheels, and, more particularly to a vehicle suspension apparatus for preventing displacement of an automobile body by converting a shift position in a vehicle prior to acceleration of the vehicle from a parked position.

In general, in a vehicle having an automatic transmission of the type described above, a shift position in the automatic transmission is shifted from either the P (parking) or N (neutral) positions to any of the running positions of L (low), 2 (second), D (drive) or R (reverse) when the vehicle is in a parked state with its parking brake engaged. Under these circumstances, a vehicle body is varied in its position by the influence of a torque acting on the drive wheels. For example, when the gears L, 2, or D are engaged, the rear of the body sinks as compared with the front of the body, while, when the R gear is engaged, the rear of the body floats as compared with the front at the R position. This elevational displacement of the body does not substantially affect the movement of the vehicle, but certainly, discomforts the driver and passengers.

SUMMARY OF THE INVENTION

It is an object of the present invention to provide a vehicle suspension apparatus in a vehicle having an automatic transmission, including a fluid drive unit, wherein a change in the position of a vehicle body can be prevented by controlling and negating the vehicle's body displacement when a shift position in the automatic transmission is shifted just prior to acceleration from a parked position.

According to the present invention, there is provided a vehicle suspension apparatus comprising: fluid spring means provided in a suspension unit for supporting at least rear wheels; fluid supply means for supplying fluid through supply control valves to the fluid spring means of the suspension units supporting the rear wheels; fluid exhaust means for exhausting the fluid through exhaust control valves from the fluid spring means of the suspension units; parking brake detecting means for detecting the operated state of a parking brake; shift position detecting means for detecting the shift position of the automatic transmission including a fluid drive unit for transmitting a drive force to the wheels; and shift time control means for outputting a control start signal to open the supply control valve or the exhaust control valve during a set control time to negate a change in a vehicle body position produced at the body due to the operation when detecting by the parking brake detecting means detects that the parking brake is engaged, and when detecting the shift position the automatic transmission operated from either the parking position or the neutral position to a running position by the gear shift position detecting means.

BRIEF DESCRIPTION OF THE DRAWING

FIG. 4 is a view showing the opening and closing state of the solenoid valves 17, 30, 34, 221 to 224 and 271 to 274 of FIG. 1, used in executing vehicle height control and position control;

FIG. 12 is a view showing the opening and closing states of a solenoid valves 122, 123, 126, 127 128, 130, 132, 120f, 120r and 119 when either vehicle height or vehicle body position is controlled;

DETAILED DESCRIPTION OF THE PREFERRED EMBODIMENTS

The present invention will be described in detail with reference to the preferred embodiment and in conjunction with the accompanying drawings.

A first embodiment of the present invention will be described first with reference to FIGS. 1 to 7.

Figure 1:
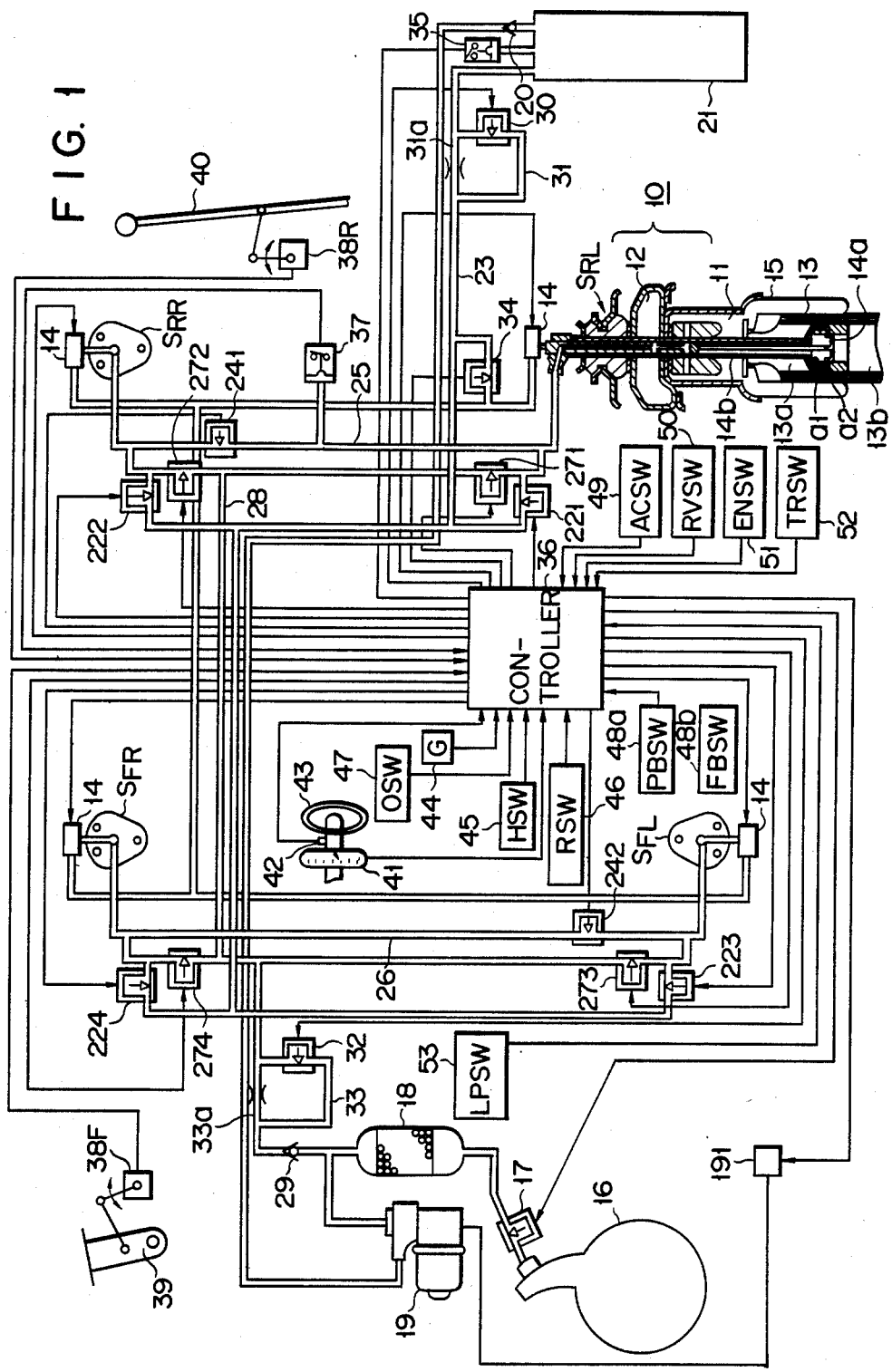
FIG. 1 is a view of the entire construction, showing a suspension apparatus according to a first embodiment of the present invention.

In FIG. 1, reference numeral $S_{FR}$ denotes a front wheel suspension unit of a vehicle; $S_{FL}$, a front wheel suspension unit; $S_{RR}$, a rear right wheel suspension unit; and $S_{RL}$, a rear left wheel suspension unit. The units $S_{FR}$, $S_{FL}$, $S_{RR}$ and $S_{RL}$ have identical structures and are exemplified by the unit $S_{RL}$. The unit $S_{RL}$ comprises a main air spring chamber 11 and an auxiliary air spring chamber 12, a shock absorber 13 and a coil spring (not shown) used as an auxiliary spring. An air spring 10 consists of the chambers 11 and 12.

Reference numeral 14 designates an actuator for switching the damping force of the shock absorber 13 to hard or soft. The actuator 14 rotatably displaces a damping force switching valve 14a, together with a control rod 14b, to select either one of the states where a first oil chamber 13a, defined by a piston, communicates only through an orifice a1 with a second oil chamber 13b, or where the chamber 12 communicates through both the orifices a1 and a2 with the chamber 13b.

The actuator 14 further rotates the control rod 14b to simultaneously control the communication and the noncommunication between the chambers 11 and 12, thereby simultaneously switching between the hard and the soft options of the air spring. The actuator 14 is controlled by a controller 36 having a microcomputer. Reference numeral 15 denotes a bellows for defining part of the chamber 11.

Reference numeral 16 denotes an air cleaner. Air received through the cleaner 16 is supplied to a drier 18 through an atmospheric air sealing solenoid valve 17. Air dried by the drier 18 is compressed by a compressor 19 and stored in a reserve tank 21 through a check valve 20. Reference numeral 191 denotes a compressor relay, and reference character 21a denotes a pressure switch which switches ON when the pressure in the tank 21 reaches a set value or lower; a controller 36 controls, via switch 21a, the relay 191 ON when the pressure in the tank 21 decreases to a set value or lower.

The tank 21 is connected to the main and auxiliary air spring chambers 11 and 12 in the suspension units through an air intake pipe 23 having air supply solenoid valves 221 to 224 respectively. The chambers 11 and 12, in the units $S_{FL}$ and $S_{FR}$, are coupled to each other through a communicating pipe 26 having a communicating solenoid valve 242. Similarly, the chambers 11 and 12, in the units $S_{RL}$ and $S_{RR}$, are coupled to each other through a communicating pipe 25 having a communicating solenoid valve 241.

The compressed air in the suspension unit chambers 11 and 12 is exhausted through an exhaust pipe 28 complete with exhaust solenoid valves 271 to 274, a check valve 29, the drier 18, the valve 17 and the cleaner 16.

A pipe 31 having an air intake path selection solenoid valve 30 is arranged in parallel with the pipe 23. When the valve 30 is closed, the compressed air is supplied from the tank 21 to the respective suspension units through only a small-diameter path 31a. However, the valve 30 is opened, the compressed air is supplied from the tank 21 to the respective suspension units through both the path 31a and the large-diameter path 31.

A pipe having an exhaust path selection solenoid valve 32 is arranged in parallel with the pipe 28. When the valve 32 is closed, the compressed air is exhausted from the respective suspension units to the drier 18 through a small-diameter path 33a. However, when the valve 32 is opened, the compressed air is exhausted through the path 33a and the large-diameter path 33.

A hard/soft selection solenoid valve 34 is inserted between the pipe 23 and the unit 14. The valve 34 is controlled in response to a signal from the controller 36.

Pressure within the tank 21 is detected by a pressure switch 35. A detection signal from the switch 35 is supplied to the controller 36. Reference numeral 37 denotes a pressure sensor for detecting the internal pressure of the chambers 11 and 12 of the rear suspension units $S_{RL}$ and $S_{RR}$. A detection signal from the sensor 37 is supplied to the controller 36.

Reference numeral 38F denotes a front vehicle height sensor mounted between a front right lower arm 39 of a suspension and the vehicle body to detect vehicle height at the vehicle's front end. Reference numeral 38R denotes a rear vehicle height sensor mounted between a rear left lateral rod 40 of a suspension and the vehicle body to detect vehicle height at the rear end of the vehicle. Vehicle height signals from the sensors 38F and 38R are supplied to the controller 36. Each of these sensors 38F and 38R detects the distance between the current level and a normal, high or low vehicle height.

Reference numeral 41 denotes a vehicle velocity sensor for detecting vehicle velocity, while 42 denotes a steering state sensor for detecting both steering angle and a steering angular velocity of a steering vehicle wheel 43. Reference numeral 44 denotes an acceleration (G) sensor for detecting back-and-forth, right-and-left and vertical acceleration. The sensor 44 can be of a type wherein a weight is suspended and a shielding plate, interlocked with the weight, shields light from a light-emitting diode so as to prevent light from reaching a photodiode in the absence of acceleration, acceleration being detected when the weight is inclined or moved so as to allow light from the light-emitting diode to reach the photodiode. Detection signals from the sensor 41, 42 and 44 are supplied to the controller 36.

Reference numeral 45 denotes a vehicle height selection switch for setting vehicle height at a target high vehicle height (HIGH), low vehicle height (LOW) or automatic vehicle height (AUTO), while 46 denotes a position control selection switch (RSW) for controlling position control so as to decrease vehicular body roll. Reference numeral 47 denotes a hydraulic sensor (OSW) for detecting the hydraulic pressure of engine lubricant; 48a, a parking brake sensor (PBSW) for detecting the operating state of the parking brake; and 48b, a foot brake sensor (FBSW) for detecting the operating state of the foot brake. Reference numeral 49 denotes an accelerator pedal sensor (ACSW) for detecting the state of the accelerator pedal with respect to its being depressed; 50, an engine speed sensor (RVSW) for detecting engine speed; 51, an engine switch (ENSW) such as an ignition switch for starting the engine; 52, a shift position sensor (TRSW) for detecting shift positions (L: low, 2: second, D: drive, N: neutral, R: reverse, and P: parking positions) of an automatic transmission having a fluid drive unit such as a torque converter, not shown; and 53, a pressure sensor (LPSW) for detecting the line pressure in the control of the gear ratio in the automatic transmission. Output signals from the switches 45, 46 and 51, and detection signals from the sensors 47, 48, 49, 50, 52 and 53 are supplied to the controller 36.

Figure 2A:
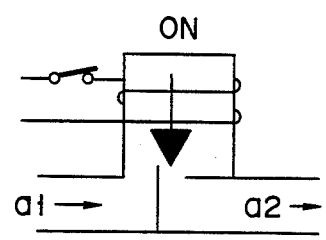
FIGS. 2A and FIG. 2B are views showing, respectively, the ON and OFF states of solenoid valves of FIG. 1.
Figure 2B:
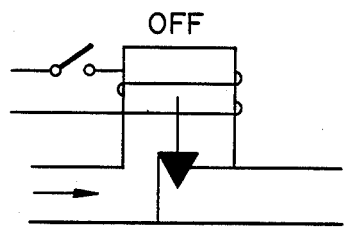

The valves 17, 221 to 224, 271 to 274, 30 and 34 comprise normally closed valves, while the valves 241 and 242 comprise normally open valves. FIGS. 2A and 2B are views illustrating the normally closed valves, with FIG. 2A also showing the state where the valves are energized and open. In this state, air flows as designated by arrows a1 to a2. FIG. 2B shows the state where the valves are not energized. In this state, air flow is interrupted. The normally open valves are not shown, but they have an operation reverse to that of the normally closed valves.

Figure 3:
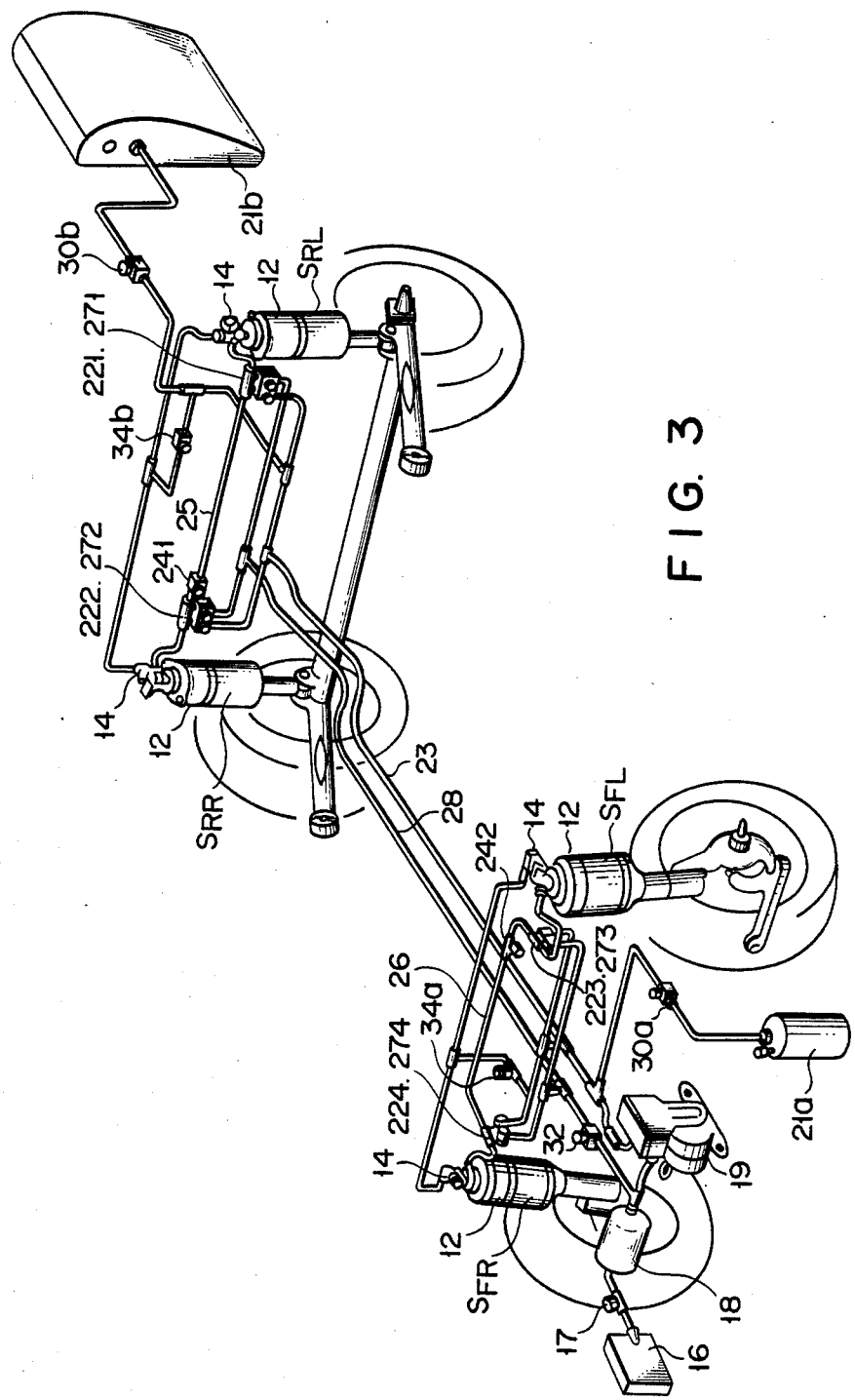
FIG. 3 is a view of the entire construction of another example of the vehicle suspension apparatus different from FIG. 1.

FIG. 3 shows another example of an air pipe of the above-mentioned suspension apparatus. In this example, the reserve tank 21 in FIG. 1 is divided into a front reserve tank 21a and a rear reserve tank 21b. Thus, the air intake path selection valve 30 is also divided into a front valve 30a and a rear valve 30b. Similarly, the hard/soft selection solenoid valve 34 is divided into a front valve 34a and a rear valve 34b.

The controller 36 compares the target vehicle height set by a vehicle height selection switch 45 with the vehicle heights detected by vehicle height sensors 38F, 38R, and controls the respective valves such that the vehicle height coincides with the target heights, thereby controlling the vehicle height.

The position control function can be performed as follows. The controller 36 detects a change in vehicle position and direction in accordance with the outputs from the corresponding sensors, and controls the corresponding solenoid valves so as to negate the change in vehicle body position.

When the vehicle height control described above is to be performed, the valves 30 and 32 are closed to slowly change the vehicle height so as to eliminate discomfort to the driver and passengers. When the position control described above is to be performed, the valves 30 and 32 are opened to cancel influence of a rapid positional change.

The opening/closing states of the respective valves will be described, with reference to FIG. 4, when the above-mentioned vehicle height and position control operations are performed. FIG. 4 shows the opening/closing states of the valves in FIG. 1, in the respective modes. (Circles represent the ON state, and crosses represent the OFF state.)

In the normal mode, only the valves 242 and 241 are opened, so that the air springs 10 in the right and left suspension units communicate with each other. In this state, since the volume of each air spring 10 is substantially increased, the spring constant is decreased to improve riding comfort.

In the vehicle height control mode, vehicle height signals detected by the sensors 38F and 38R are compared with the target vehicle heights set by the switches 45. In order to increase the vehicle height, the corresponding supply solenoid valves are opened. Contrastingly, in order to decrease the vehicle height, the corresponding exhaust solenoid valves are opened. In the vehicle height control mode, the valves 242 and 241 are opened to maintain comfort. The valves 30 and 32 are closed in the height control mode. Therefore, height control is performed slowly to maintain the comfort of the driver and passengers.

Roll control comprises a start mode in which the compressed air is supplied to the air spring 10 disposed along the right-and-left direction of the vehicle, and exhausted from the spring 10 which is moved upward; a holding mode in which the state obtained in the start mode is held; and a return mode in which, when the cause of the roll is eliminated, right and left air springs 10 are set at the same pressure.

In the start mode, the associated air supply solenoid valves and the associated air exhaust solenoid valves are opened for a predetermined period of time and, at the same time, the valves 30 and 32 are opened briefly to perform the position control operation. In the hold mode, only the path selection solenoid valves are kept open. Under this condition, when a lateral acceleration acting on the vehicle during turning increases, the compressed air must be additionally supplied to and exhausted from the corresponding air spring 10. Such additional supply and exhaust of the compressed air can be quickly performed. In the return mode, only the valves 241 and 242 are opened, so as to restore the same state as in the normal mode.

Braking control (nose dive control) also comprises a start mode in which the compressed air is supplied to the front air spring 10 in a predetermined volume and, at the same time, exhausted from the rear air spring 10 in a predetermined volume; a holding mode in which the state obtained in the start mode is maintained; and a return mode in which, when the cause of the nose dive is eliminated, the compressed air is exhausted from the front air springs 10 in a predetermined volume and, at the same time, supplied to the rear air springs 10 in a predetermined volume.

In the start mode, the valves 223, 224, and 271, 272 are opened for a predetermined period of time and, at the same time, the respective path selection solenoid valves are opened. In the hold mode, only the front and rear path selection solenoid valves are opened in the same manner as for roll control. In the return mode, the valves 273, 274 and 221, 222 are opened for a predetermined period of time, and, at the same time, the valves 30 and 32 are kept open.

Acceleration control (squat control) also comprises a start mode in which the compressed air is exhausted from the front air spring 10 in a predetermined volume and supplied to the rear air spring 10 in a predetermined volume; a hold mode in which the state obtained in the start mode is held; and a return mode in which, when the cause of the squat is eliminated, the compressed air is exhausted from the rear air spring 10 and supplied to the front air spring 10 in a predetermined volume.

In the start mode, the valves 273, 274 and 221, 222 are opened for a predetermined period of time and, at the same time, the valves 30 and 32 are opened. In the holding mode, the valves 30 and 32 are kept open in the same manner as in roll control. In the return mode, the compressed air is exhausted from the valves 223 and 224 and supplied to the valves 271 and 272 for a predetermined period of time, the valves 30 and 32 being kept open.

Figure 5:
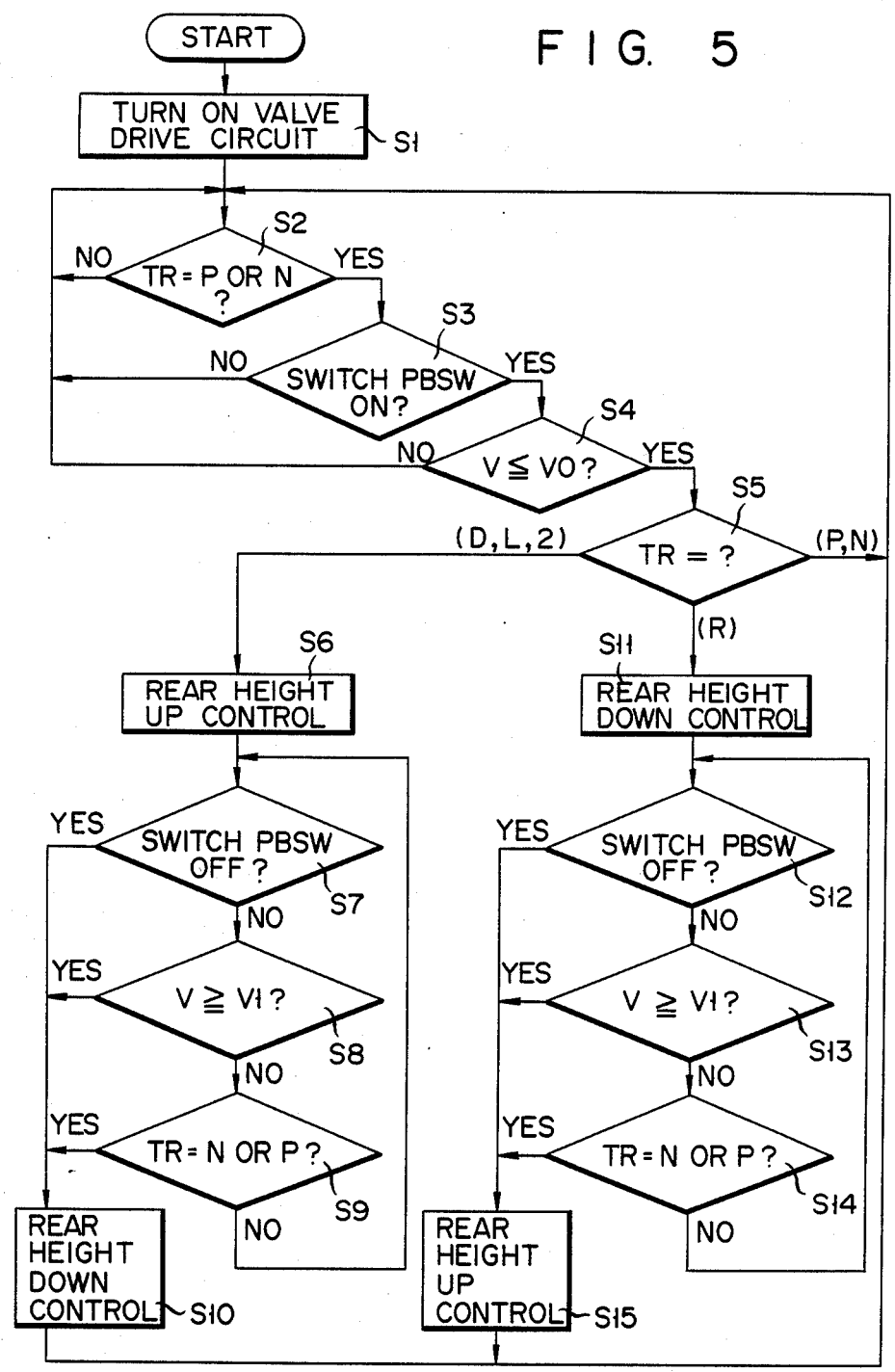
FIG. 5 is a flow chart of the control process at the shifting time in the first embodiment.

The actual control at the shifting time by the controller 36 in the first embodiment will be described in accordance with FIG. 5.

When an engine switch 51 is started, a signal is supplied, in step S1, from the switch 51 to the controller 36 and a valve drive circuit for controlling the position of a vehicle body is turned on in step S1. Then, the flow advances to step S2 and the shift position sensor 52 determines whether or not the shift position TR, detected by sensor 52, is in the park (P) or neutral (N) positions. If YES in step S2, the flow advances to step S3 and the parking brake sensor 48a determines whether or not the parking brake is engaged. If YES in step S3, the flow advances to step S4 wherein the vehicle velocity sensor 41 determines whether or not the vehicle velocity V detected by the sensor 41 is lower than a set value V0 (e.g., 3 km/hr). If YES in step S4, the flow advances to step S5 and the sensor 52 rechecks the gear position to determine the present shift position, as detected by the sensor 52.

If NO in steps S2, S3 or S4, namely, when the shift position is already in a position other than the P or N position, either the parking brake is not disengaged or the vehicle velocity exceeds the set value. It is, therefore, not necessary to control the body position and the flow again returns to step S2 to observe the next change of state.

If the shift position is determined, in step S5, to have been shifted into a forward drive position from P or N to D, L or 2, the flow advances to step S6 and it is determined whether or not the vehicle height at the rear wheel needs to be up controlled. In other words, in step S6, the controller 36 turns off the valves 30 and 32, and outputs a control signal to open the valves 221 and 222 for a set period of time. Thus, compressed air is supplied in a set amount from the tank 21 to the main and sub air spring chambers 11 and 12 of the suspension units $S_{RL}$ and $S_{RR}$ of the rear wheels to raise the vehicle height of the rear end. Therefore, when the shift position is shifted to the forward drive position the sink of the rear end of the body by the reaction of the torque acting on the drive wheels is negated, thereby substantially preventing displacement of the vehicle body.

When the process in step S6 is finished, the flow advances to step S7 and it is determined whether or not the the parking brake, detected by the sensor 48a, is disengaged. If NO in step S7, the flow advances to step S8 and it is determined whether or not the vehicle velocity detected by the sensor 41 is greater than the set value V1 (e.g., 3 km/hr). If NO in step S8, the flow advances to step S9 and it is determined whether or not the shift position, detected by the sensor 52, is N or P. If NO in step S9, the flow returns to step S7.

If YES in any of steps S7, S8 and S9, the flow advances to step S10, wherein the valves 30, 32 are turned off, and a control signal is output to open the rear valves 271, 272 for the set period. Thus, compressed air is exhausted in the set amount from the main and sub air spring chambers 11 and 12 of the suspension units $S_{RL}$ and $S_{RR}$ to lower the rear end vehicle height. Therefore, floating of the rear end of the vehicle body due to a reaction when the parking brake is disengaged, the vehicle velocity becomes greater than the set value, or when the shift position is shifted from the forward position to N or P again to eliminate the cause of the sink of the rear end of the body is cancelled, thereby substantially preventing the displacement of the vehicle body, and the pressure in the chambers 11, 12 of the rear suspension units $S_{RL}$, $S_{RR}$ returns to the original.

If the shift position TR is shifted in to the reverse position, i.e., from P or N to R in step S5, the flow advances to step S11 to thereby controlling the position of the vehicle body lowering the rear end vehicle height. In other words, in step S11, the controller 36 turns off the valves 30 and 32 and outputs a control signal to open the valves 271 and 272 of the rear end for the set period. Thus, compressed air is exhausted in the set amount from the main and sub chambers 11 and 12 of the suspension units $S_{RL}$ and $S_{RR}$ of the rear end to lower the rear end vehicle height. Therefore, floating of the body's rear end as a result of the reaction to the torque acting on the drive wheels when the shift position TR is shifted in to reverse can be negated to substantially prevent displacement of the vehicle body.

If the process in step S11 is finished, the flow advances to step S12, and it is determined whether or not the the parking brake, detected by the sensor 48a, is engaged. If NO in step S12, the flow advances to step S13, and it is determined whether or not the vehicle velocity, detected by the sensor 41, is greater than the set value V1 (e.g., 3 km/hr). If No in step S13, the flow advances to step S14, and it is determined whether or not the shift position, detected by the sensor 52, is N or P. If NO in step S14, the flow returns to step S12.

If YES in any of steps S12, S13 and S14, the flow advances to step S15, the valves 30 and 32 are turned off, and a control signal is output to open the valves 221 and 222 for the set period. Thus, compressed air is supplied in the set amount from the tank 21 to the main and sub chambers 11 and 12 of the suspension units $S_{RL}$ and $S_{RR}$ of the rear end to raise the rear end vehicle height. Therefore, sinking of the rear end of the body due to the reaction when the parking brake is disengaged and the vehicle velocity becomes greater than the set value, or, when the shift position is shifted from reverse to N or P again, to eliminate the cause of floating of the rear wheel side due to reaction is negated, thereby substantially preventing the displacement of the body at the rear end and the pressure in the chambers 11, 12 of the rear suspension units $S_{RL}$, $S_{RR}$ returns to the original.

Conversely, it is not necessary to control displacement when the shift position TR is determined in step S5 to be P or N. Consequently the flow returns to step S2 to observe the next change in the state.

According to the first embodiment as described above, in a vehicle having an automatic transmission, if the shift position is shifted from P or N to the forward or reverse positions when the parking brake is engaged at the speed lower than the set value, the rear end vehicle height is controlled to be raised at the forward position and to be lowered at the reverse position. Therefore, "sinking" or "floating" of the vehicle body can be negated, thereby substantially preventing the displacement of the vehicle body. Further, when air supply valve or exhaust valve is controlled to open in steps S6, S10, S11, S15, the valves 30, 32 are simultaneously closed to slowly supply or exhaust compressed air through the paths 31a or 33a of small diameter. Therefore, suitable control can be performed for the small displacement of the vehicle body as compared with the rolling at running time, squat time at the starting and accelerating time or nose diving at the abrupt braking time, thereby reducing the discomforting the driver and passengers. Further, when the air supply or exhaust valve is controlled to open in steps S6, S10, S11, S15, the valves 30, 32 are simultaneously closed to supply or exhaust compressed air slowly through the path 31a or 33a of small diameter. Thus, even if the change in the position of the vehicle caused by the timing of supplying to the chambers 11, 12 or exhausting from the chambers 11, 12 and the shifting position is slightly lagged by the, process of steps S6, S10, S11, S15, the discomforting the driver and the passengers can be reduced as much as possible.

Figure 6:
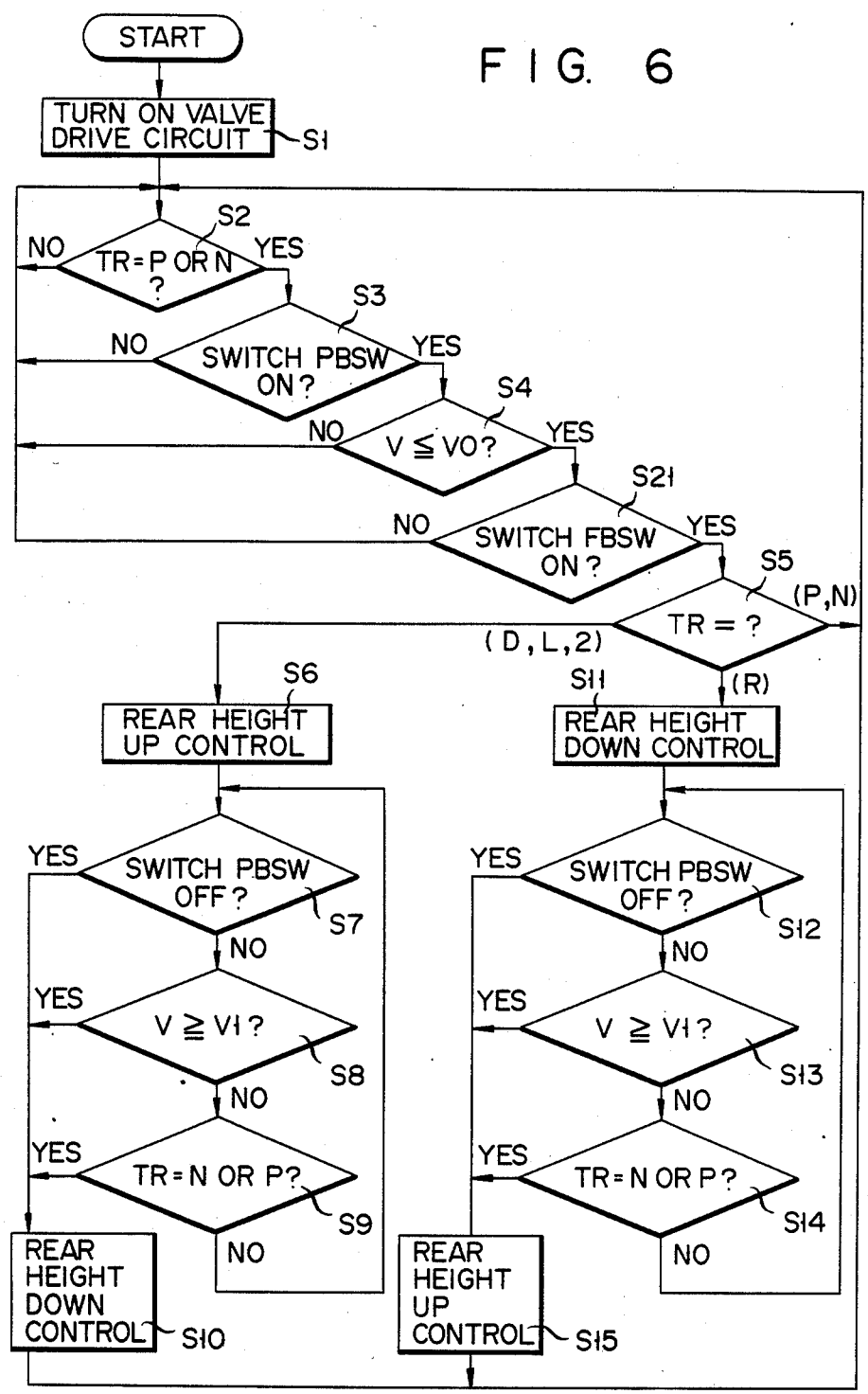
FIG. 6 is a flow chart showing a second embodiment of this invention.

Then, the second embodiment of the invention will be described in accordance with FIG. 6.

The second embodiment is constructed fundamentally the same as the first embodiment, and the same steps as in the second embodiment denote the same operations as in the first embodiment, and the description will be omitted. The different points from the first embodiment are as follows. First, at least one of the front and rear wheels in the suspension apparatus is supported to the vehicle body through suspension arm extending longitudinally of the body of trailing or leading type. Second, as apparent from FIG. 6 with respect to the control by the controller 36, step S21 is provided between the steps S4 and S5 of the flow chart in FIG. 5 of the first embodiment. In step S21, it is determined whether or not the foot brake detected by the sensor 48, is disengaged. If YES in step S21, the flow advances to step S5. If NO in step S21, the flow returns to step S2. In other words, in the second embodiment, even if YES in steps S2, S3 and S4, the control is inhibited when the foot brake is engaged.

According to the second embodiment, the following advantages can be provided in addition to the same advantages of the first embodiment.

The distance between the front wheels and the rear wheels varies if the wheels move elevationally in the suspension apparatus supported to the vehicle body through the suspension arms extending longitudinally of the body as described above, the wheels cannot move elevationally with respect to the body even if the wheels tend to elevationally move due to the frictional force between the wheels and the road surface in the state that the foot brake for braking all the wheels is engaged in the stopped state, and the suspension units are locked. Therefore, in the suspension apparatus of this type, even if the gear position of the automatic transmission is shifted from P or N to D, L, 2 or R at the running position in the state that the foot brake is operated, the sinking or floating of the rear end of the body does not occur. Therefore, even when the shift position is shifted from P or N to D, L, 2 in the automatic transmission in the state that the foot brake is engaged, it is not necessary to control as in the first embodiment, but if the control is, on the contrary, performed, the rear end of the body is displaced at the moment that the foot brake is disengaged to cause discomforting the driver and passengers.

However, according to the second embodiment described above, the control is inhibited by the process of the step S21 when the foot brake is engaged. Therefore, unnecessary control can be avoided, and the discomforting can be eliminated.

Figure 7:
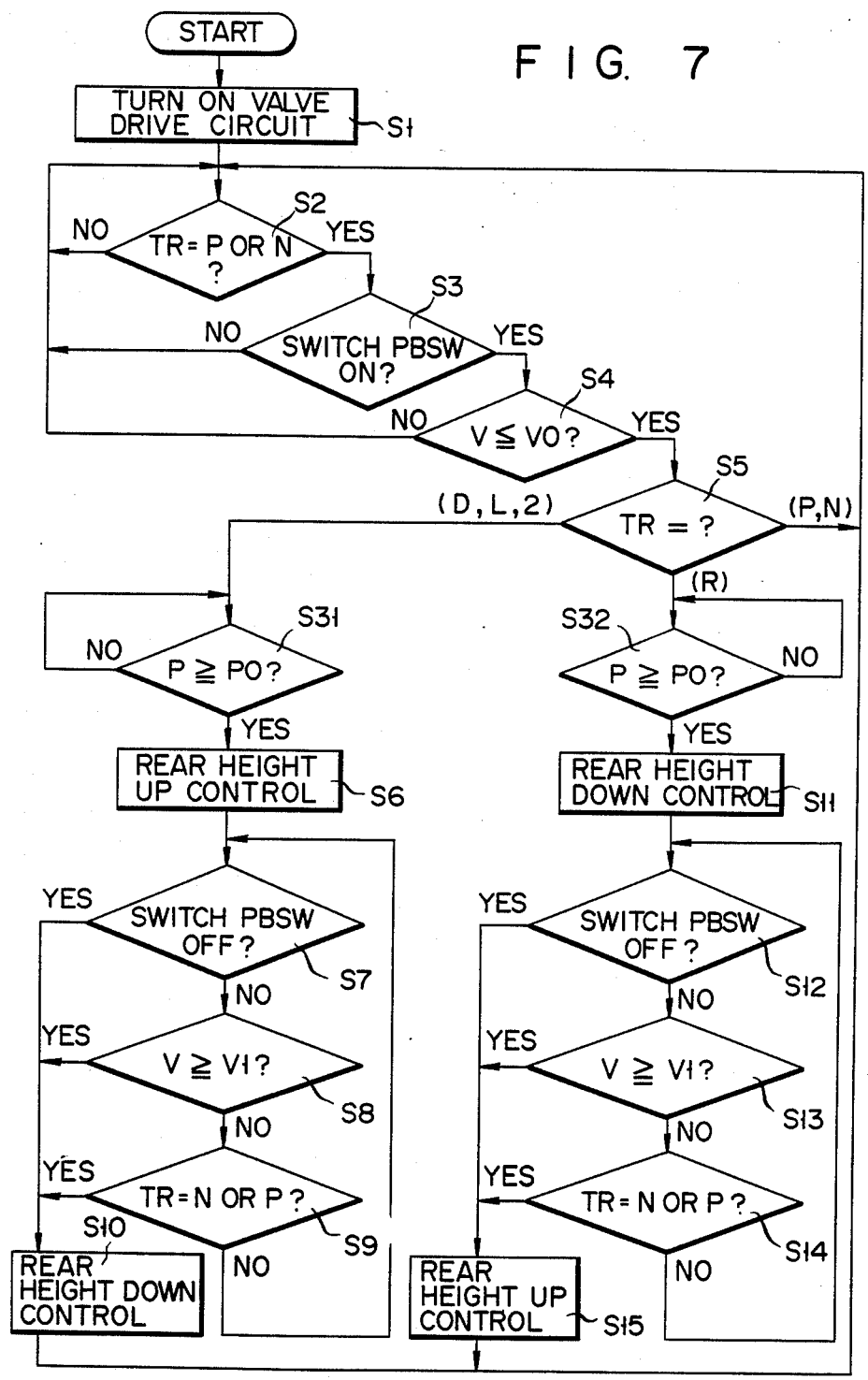
FIG. 7 is a flow chart showing the process of a third embodiment of the invention.

Third embodiment of the invention will be described in accordance with FIG. 7.

The third embodiment is substantially the same as the first embodiment, and the same steps as in the first embodiment denote the same operations as in the first embodiment, and the description will be omitted. The different points from the first embodiment are as below. As apparent from FIG. 7 with respect to the control by the controller 36, step S31 is provided between the steps S5 and S6 of the flow chart in FIG. 5, and step S32 is provided between the steps S5 and S11. In step S31, it is determined whether or not the line pressure P in the automatic transmission detected by the sensor 53 is higher than the predetermined value P0 (kg/cm$^2$). If YES in step S31, the flow advances to step S6. If NO in step S31, the flow returns to step S31. Similarly, in step S32 it is determined whether or not the line pressure P in the automatic transmission detected by the sensor 53 is higher than the predetermined value P0 (kg/cm$^2$). If YES in step S32, the flow advances to step S11. If NO in step S32, the flow returns to step S32. In other words, if the shift position is determined to be shifted form P or N to forward or reverse position, the flow does not advance to step S6 or S11 unless the line pressure in the automatic transmission becomes higher than the set value by the process of step S31 or S32.

According to the third embodiment, the following advantages can be provided in addition to the advantages of the first embodiment.

Since the moment when the line pressure P in the automatic transmission becomes higher than the predetermined value, transmitting the torque on the driving wheels, and the moment when the control at steps S6 or S11 is executed can be coincided with by the process of above-mentioned steps S31 or S32, the control for preventing the displacement of the body at shifting can be executed the accurate time.

The fourth embodiment of the invention will be described in accordance with FIGS. 8 to 14.

Figure 8:
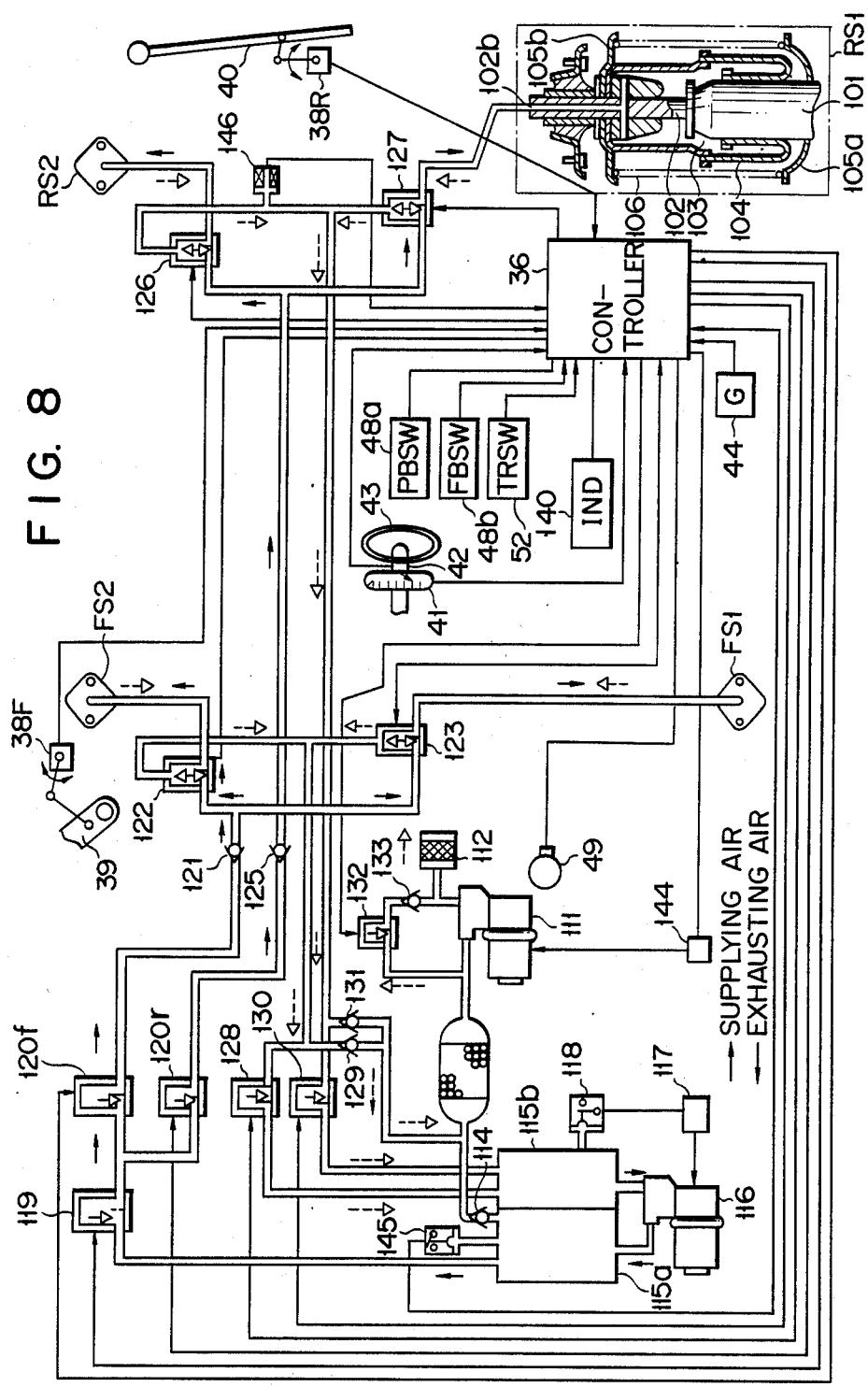
FIG. 8 is a view of the entire construction showing a suspension apparatus according to a fourth embodiment of the invention.

In FIG. 8, FS1 is a front left wheel suspension unit, FS2 is a front right wheel suspension unit, RS1 is a rear left wheel suspension unit, and RS2 is a rear right wheel suspension unit. Since the units FS1, FS2, RS1, RS2 have identical structures to each other, the suspension units will be described with reference character S except that the front and rear or the right and left wheels will be described distinctly.

The suspension unit S has a strut type shock absorber 101. The shock absorber 101 has a cylinder mounted at the wheel side, a piston slidably telescoped into the cylinder, and a piston rod 102 supported at the upper end to the body side. The unit S has an air spring chamber 103 having a function of controlling the vehicle height coaxially with the rod 102 at the top of the absorber 101. The chamber 103 is formed partly of bellows 104 to supply or exhaust air to the chamber 103 through a path 102a formed at the rod 102, thereby raising or lowering the vehicle height.

A spring retainer 105a directed upwardly is provided on the outer wall of the cylinder of the shock absorber 101, a spring retainer 105b directed downwardly is provided at the outer wall of the rod 102, and a coiled spring 106 is compressed between the retainers 105a and 105b. The spring 106 partly supports the vehicle weight.

A compressor 111 compresses atmospheric air fed from an air cleaner 112, and supplies to a high pressure reservoir tank 115a through a drier 112 and a check valve 114. Thus, the compressor 111 compresses the atmospheric air fed form the air cleaner 112 and supplies to the drier 113. Therefore, the compressed air dried by silica gel in the drier 113 is retained in the high pressure reservoir tank 115a. The compressor 116 is connected at the suction port with the same low pressure reservoir tank 115b and at the exhaust port with the high pressure reservoir tank 115a. Numeral 118 designates a pressure switch which turns on when the pressure in the tank 115b rises higher than the set value (e.g., atmospheric pressure). The compressor 116 is driven by the compressor relay 117 which is turned on by the on signal of the switch 118. Thus, the pressure the tank 115b is always maintained at the first set value.

The air supplied from the tank 115a to the chambers 103 of the unit S as designated by a solid line with arrow in FIG. 8. The compressed air in the tank 115a is fed to the chambers 102 of the units FS1, RS2 through feed air flow rate control valve 119, a front air supply solenoid valve 120f, a check valve 121, a front right solenoid valve 122 or front left solenoid valve 123. Similarly, compressed air in the tank 115a is supplied to the chambers 103 of the units RS1, RS1 through supply flow rate control valve 119, rear supply solenoid valve 120r, a check valve 125, rear right solenoid valve 126 or a rear left solenoid valve 127.

On the other hand, exhaust air from the chambers 103 of the respective suspension units S flows as designated by broken line with arrows in FIG. 8. The compressed air in the chambers 103 of the units RS1, RS2 is fed through the solenoid valves 122, 123 and front exhaust solenoid valves 128 into the tank 115b, or through the solenoid valves 122, 123, a check valve 129, a drier 113, exhaust solenoid valve 132, a check valve 133 and an air cleaner 112 to the atmosphere. Similarly, compressed air in the chambers 103 of the units RS1, RS2 is exhausted through the valve 126, the valve 127 and the valve 130 into the tank 115b, or through the valves 126, 127, the check valves 131, the drier 113, the valve 132, the valve 133 and the air cleaner 112 to the atmosphere.

Figure 9A:
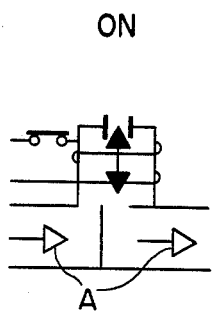
FIGS. 9A and 9B are views showing the ON and OFF states of solenoid valves 122, 123, 126 and 127 shown in FIG. 8.
Figure 9B:
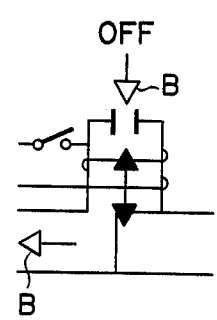
Figure 10A:
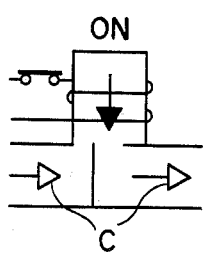
FIGS. 10A and 10B are views showing the ON and OFF states of solenoid valves 120f, 120r, 128, 130 and 132 shown in FIG. 8.
Figure 10B:
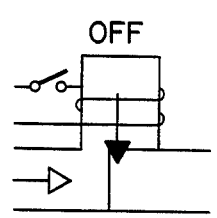
Figure 11A:
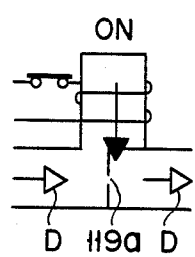
FIGS. 11A and 11B are views showing the ON and OFF states of the solenoid valves 119 shown in FIG. 8.
Figure 11B:
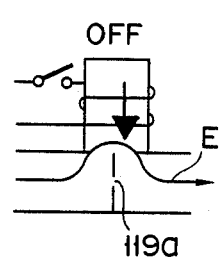

The valves 122, 123, 126, 127 described above allow air flow as designated by arrows A in ON state (conductive state) as shown in FIG. 9A, and air flow as designated by arrows B in OFF state (nonconductive state) as shown in FIG. 9B. The valves 120f, 120r, 128, 130 and 132 allow the air flow as designated by arrows C in ON state (conductive state) as shown in FIG. 10A, and inhibit the air flow in OFF state (nonconductive state)

as shown in FIG. 10B. The air supply flow rate control valve 119 is passed only through an orifice 119a as designated by an arrow D in ON state (conductive state) as shown in FIG. 11A and allows air flow designated by arrow E in addition to the air flow through the orifice 119a in OFF state (nonconductive state) as shown in FIG. 11B.

The check valves 129, 131 are constructed, in addition to the function of one directional valve, to open when the differential pressure between the upstream side and the downstream side is higher than the set value. In other words, the pressure of the upstream side (the side near the chamber 103 of the unit S) of the valves 129, 131 can be prevented from decreasing lower than the set value.

The front vehicle height sensor 38F, rear vehicle height sensor 38R, vehicle velocity sensor 41, steering sensor 42, acceleration sensor 44, parking brake sensor 48a, foot brake sensor 48b and shift position sensor 52 shown in FIG. 8 have the same structures as those of the first embodiment, and the switch and sensor signals are inputted to the controller 36 having a microcomputer (not shown). The solenoid valves are controlled by a control signal from the controller 36.

In FIG. 8, numeral 140 designates an indicator (IND) for indicating the oil pressure of lubricating oil of the engine; and numeral 145, a pressure switch which turns on when the pressure in the tank 115a becomes lower than the set value. The controller 36 inputs the detection signal of the switch 145 and detects that the pressure in the tank 115a is lower than the set value, and then drives the compressor 111 through a compressor relay 144. Numeral 146 designates a pressure sensor for detecting the pressure of the chambers 103 of the rear units RS1, RS2, and the detection signal of the sensor 146 is inputted to the controller 36.

The suspension apparatus constructed according to the fourth embodiment of the invention has substantially the same vehicle height controlling function and the position control function as those of the first embodiment. However, the types and the dispositions of the valves are different from those of the first embodiment, and will be described.

The vehicle height control function will be first described. The outputs of the vehicle height sensor 38F, 38R are first read out by the controller 36. The vehicle heights obtained by the sensors 38F, 38R are compared with the target vehicle height set in the controller 36, which outputs a control signal to the solenoid valves to control the vehicle height toward the target vehicle height. The valves are turned off at the ordinary rectilinear running time to supply and exhaust no air and to communicate between the air spring chambers of the right and left suspension units. Thus, the chambers of the suspension units are held at the same pressure.

Then, concrete example of controlling the vehicle height will be described.

If the heights obtained from the sensors 38F, 38R are, for example, lower than the target vehicle height, front air supply solenoid valve 120f and the rear air supply solenoid valve 120r are turned on by the control signal from the controller 36 to become the state shown in FIG. 10A, and the air supply flow rate control valve 119 is turned on to becomes the state shown in FIG. 11A. Then, the solenoid valves 122, 123, 125 and 127 are also turned on, but retained in the state of FIG. 9A. Thus, compressed air is supplied from the tank 115a through the valves 119, 120f, 131 and 122, 123 to the chambers 103 of the suspension units FS1, FS2. Simultaneously, compressed air is supplied from the tank 115a through the valves 119, 120r, 125, 126, 127 to the chambers 103 of the units RS1, RS2. Thus, the vehicle heights of front or rear side of the vehicle body is raised. When the vehicle height obtained by the sensors 38F, 38R coincide with the target vehicle height, the valves 120f, 120r are closed by the control signal from the controller 36. Thus, the vehicle height control is stopped.

On the other hand, if the vehicle heights obtained by the sensors 38F, 38R are higher than the target vehicle height, the valve 132 is turned on to become the state shown in FIG. 10A. Thus, part of the compressed air of the chambers 103 of the units FS1, FS2, RS1, RS2 are exhausted into the atmosphere through the valves 122, 123, 126, 127, 129 or 131, drier 113, the valves 132, 133 and the air cleaner 112. Therefore, the vehicle heights of the front and rear sides of the vehicle body are lowered. When the vehicle height obtained by the sensors 38F, 38R coincide with the target vehicle height, the valve 132 are turned off by the control signal from the controller 36. Thus, the vehicle height control is stopped.

Then, the position controlling function performed when the steering wheel 43 is turned to the right or left will be described.

When the steering wheel 43 is turned to the right, the vehicle body tends to roll leftwardly. On the contrary, the controller 36 detects the rightward steering by the steering sensor 42. Thus, the valves 120f, 120r and 128, 130 are turned on during the set period, the valves 123, 127 of the left wheels are turned on, and the valves 120f, 120r and 128, 130 are then turned off after the set period is elapsed. Therefore, compressed air is supplied in the set amount from the tank 115a to the chambers 103 of the units FS1, RS1, and compressed air is exhausted in the set amount from the chambers 103 of the units FS2, RS2 to the tanks 115b. Thus, the vehicle body is suppressed to displace to roll leftward. This state and hence the compressed air is supplied in the set amount to the chambers 103 of the units FS1, RS1 of the left side, and the compressed air is exhausted in the set amount from the chamber 103 of the units FS2, RS2 of right side, and the states are continuously held.

Then, when the vehicle is moved from the turning to the rectilinear running, and the controller 35 detects that the steering becomes neutral by the sensor 42, the controller 36 turns off the valve 123, 127. Thus, the chambers of the right and left suspension units are held at the same pressure as before the control is started.

On the other hand, if the steering wheel 43 is turned to the left, the vehicle body tends to roll rightward. On the other hand, the controller 36 detects the leftward steering by the sensor 42. Thus, the valves 120f, 120r and 128, 130 are turned on during the set period, the valves 122, 126 are turned on, and the valves 120f, 120r and 128, 130 are turned off after the set period is elapsed. Therefore, compressed air is supplied in the set amount to the chambers 103 of the units FS2, RS2 of the right side, and compressed air is exhausted in the set amount from the chambers 103 of the units FS1, RS1 of the left side to the tank 115b. Thus, the vehicle body is suppressed to displace to roll leftward. Then, it is controlled in the same manner as when the steering wheel 43 is turned to the right.

Then, when the brake is operated, the position control of the nose diving that negative acceleration is acted on the vehicle body to sink the front side of the vehicle body is suppressed will be described. When the fact that the negative acceleration is larger than the set value in the longitudinal direction of the vehicle body is detected by the acceleration sensor 44 such as when the brake is operated, the controller 36 turns off the valves 120f, 122, 123 for the set period, and simultaneously turns of the valve 130 for the set period. Thus, the set amount of compressed air is supplied from the tank 115a to the chambers 103 of the units FS1, FS2 of the front wheels, and the set amount of compressed air is exhausted from the chambers 103 of the units RS1, RS2 to the tank 115b. Thus, the nose diving can be suppressed at the braking time. This state can be continued until the negative acceleration is weakened.

When the fact that the negative acceleration is then weakened is detected by the sensor 44, the controller 36 turns on the valve 128, for the set period, and simultaneously turns on the valves 120f, 126, 127 for the set period. Thus, compressed air is exhausted in the set amount from the units FS1, FS2 to the tank 115b, and compressed air is supplied in the set amount from the tanks 115a to the chambers 103 of the units RS1, RS2 of the rear wheels. Thus, the chambers of the units S can be returned to the state before the control is started.

Then, when the vehicle is started and accelerated, the position controlling of the squat that the acceleration is acted on the vehicle body to float the front side and to sink the rear side of the body is suppressed will be described.

When the fact that the vehicle is abruptly accelerated is detected by the sensor 44, the controller 36 turns on the valve 128 for the set period and simultaneously turns on the valves 120r, 126, 127 for the set period. Thus, compressed air is exhausted in the set amount from the units FS1, FS2 to the tank 115b and compressed air is supplied in the set amount from the tank 115a to the chambers 103 of the units RS1, RS2. Thus, the squat is suppressed. The state is continued until the acceleration is weakened.

Then, when the fact that the abrupt acceleration is weakened is detected by the sensor 44, the controller 36 turns on the valves 120f, 122, 123 during the set period and simultaneously turns on the valve 130, for the set period. Therefore, compressed air is supplied in the set amount from the tank 115a to the chambers 103 of the units FS1, FS2 of the front wheel side, and compressed air is exhausted in the set amount from the chambers 103 of the units RS1, RS2 to the tank 115b. Thus, the chambers of the units S are returned to the state before the control is started.

Figure 13A:
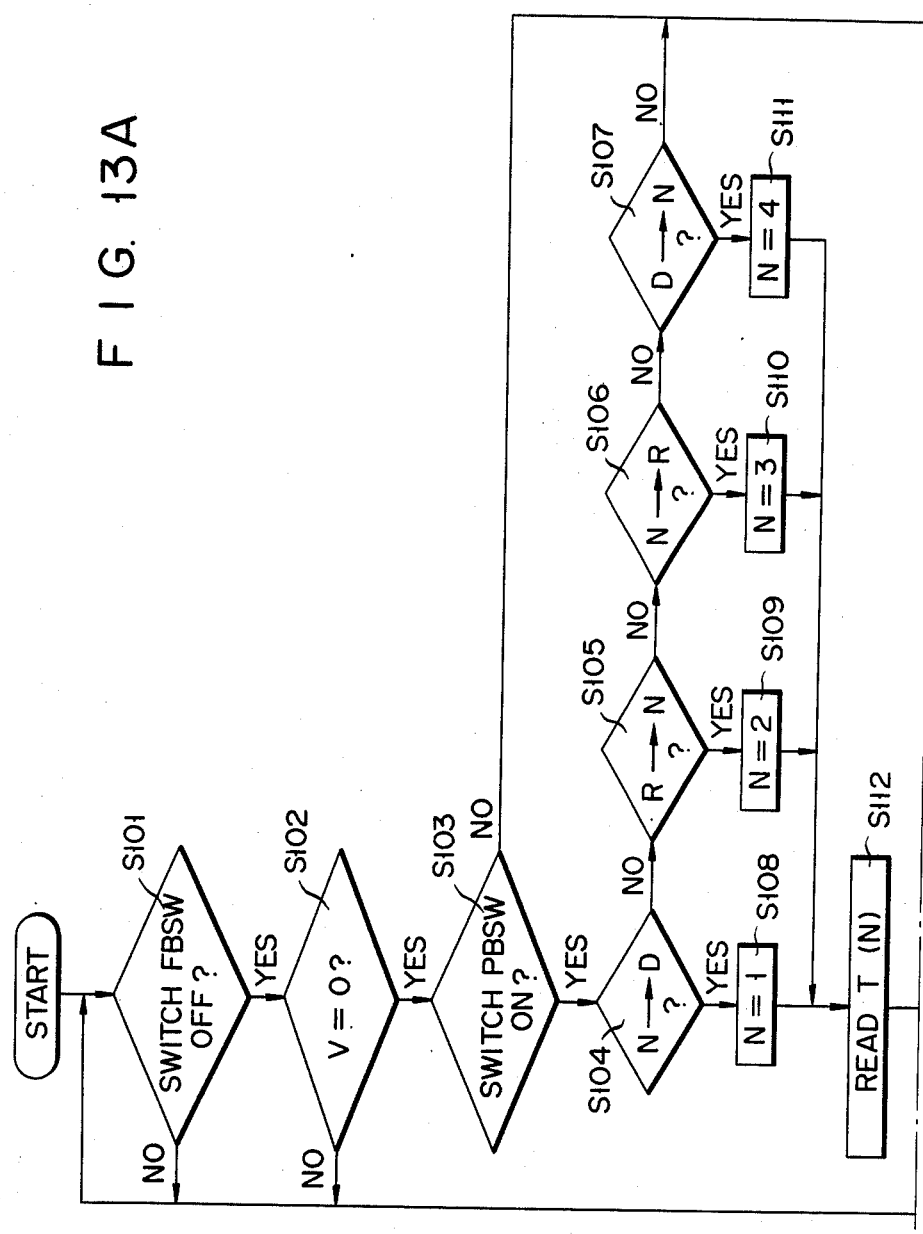
FIGS. 13A and 13B are flow charts showing the sequence of control in a fourth embodiment at the time of gear shifting.
Figure 13B:
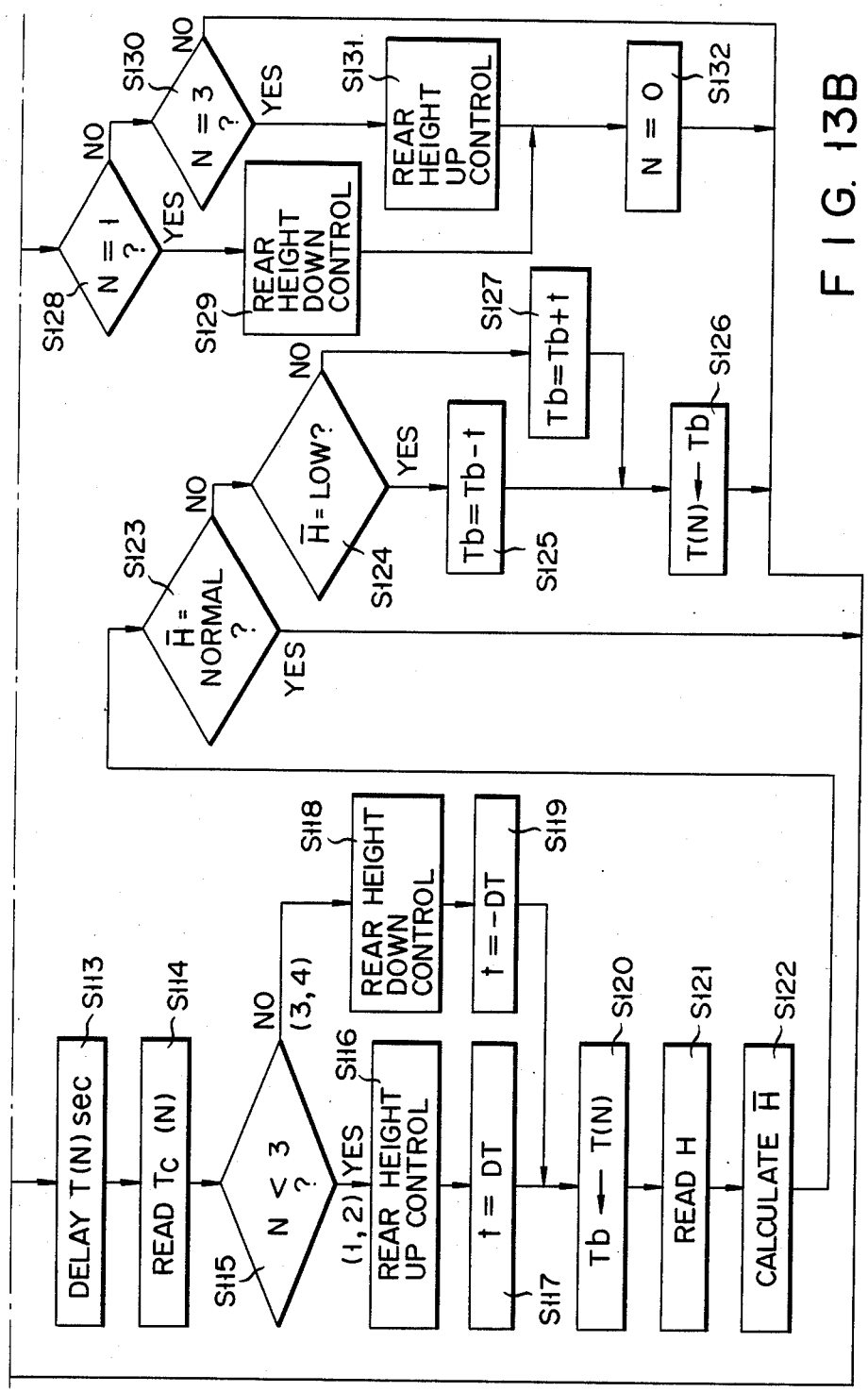

Then, concrete control at the time of shifting by the controller 36 in the fourth embodiment will be described in accordance with the flow charts of FIGS. 13A and 13B.

In step S101, the flow checks whether or not the foot brake is operated by the sensor 48b. If YES in step S101, i.e., it is determined that the foot brake is not engaged. Then, the flow advances to step S102, and it is determined whether or not the vehicle velocity V detected by the sensor 41 is "0". If YES in step S102, i.e., it is determined that the vehicle is stopped. Then, the flow advances to step S103, and determines whether or not the parking brake is engaged by the sensor 48a. If YES in step S103, and it is determined that the parking brake is engaged. Then, it is determined whether or not the operation of the transmission is shifted from any position TR (the position of the operating lever) to any shifting position on the basis of the output signal from the sensor 52 in steps S104 to S107.

Then, if YES in step S104, i.e., it is determined that the shift position is shifted from N to D, the flag N is set to "1" in the controller 36 in step S108. If YES in step S105, i.e., it is determined that the shift position is shifted from R to N, the flag N sets to "2" in the controller 36 in step S109. If YES in step S106, i.e., it is determined that the shift position is shifted from N to R, the flag N sets to "3" in the controller 36 in step S110. If YES ii step S107, i.e., it is determined that the shift position is shifted from D to N, the flag N is set to "4" in the controller 36 in step S111.

When any of the steps S108, S109, S110 or S111 is finished, the flow advances to step S112. Then, delay time T(N) corresponding to the flag N stored in the delay time memory in the controller 36 is read out in step S112, and the lapse of the delay time T(N) is waited in next step S113. This is because there is a delay from the change of the position of the vehicle body after the shifting is operated (the position of the operating lever), it is necessary to delay the time for starting the position control.

Figure 14:
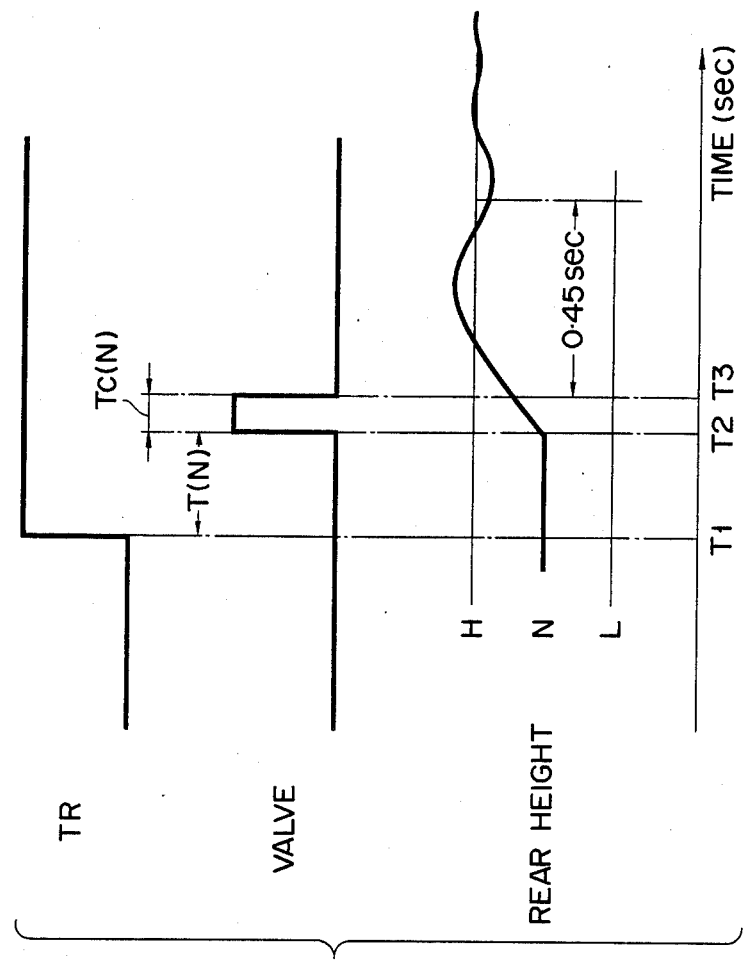
FIG. 14 is a timing chart explaining the second embodiment.

Then, the flow determines whether or not the value of the above-mentioned flag N is smaller than "3" in step S115. If YES in step S115, and hence the operating lever is shifted from N to D or R to N, the rear wheel side of the vehicle body tends to lower. Thus, the rear end of the vehicle body is controlled to be raised in step S116. In other words, in step S116, the flow turns on the valves marked with "o" in the "Rear up" mode of the vehicle height controlling mode of FIG. 12 for control time Tc(N) sec. as shown in FIG. 14 in the step S116, thereby supplying compressed air from the tank 115a in the set amount to the chambers 103 of the units RS1, RS2 of the rear wheel side. Thus, the rear end of the vehicle body is raised as shown in FIG. 14. FIG. 14 shows the change in the shifting position, FIG. 14 shows the opening or closing state of the valves, and the variation in the vehicle height at the rear end of the vehicle body. In FIG. 14, the shift position is operated at a time T1, the valves are opened at a time T2, and the valves are closed at a time T3. The control time Tc(N) is stored in the control time memory in the controller 36 corresponding to the flag N. When the process in step S116 is finished, "DT" (e.g., 0.05 sec.) is set to unit time memory "t" to be described later in the controller 36 in the next step S117.

On the other hand, if NO in step S115, i.e., the position of the operating lever is shifted from N to R, or from D to N, the rear end of the vehicle body tends to rise. Thus, the rear end of the body is controlled to be lowered in step S118. In other words, the valves marked with "o" in "Rear Down" mode of the vehicle height controlling mode of FIG. 12 is turned on during Tc(N) as shown in FIG. 14 in step S118, thereby exhausting compressed air of the set amount from the chambers 103 of the units RS1, RS2 to the tank 115b to raise the rear end of the vehicle body. Then, when the process in step S118 is finished, "−DT" (e.g., −0.05 sec.) is set to unit time memory "t" in step S119.

When the process in step S117 or S119 is finished, the flow advances to step S120, and sets the above-mentioned delay time T(N) in the time memory "Tb". The flow then advances to step S121, and the output H of the sensor 38R during the set time (e.g., 0.45 sec.), after control of the above controlling time Tc(N) is finished, is read out in the controller 36. The mean vehicle height $\overline{H}$ during 0.45 sec. is calculated in the step S122, and the flow advances to step S123. In the step S123, the flow determines whether or not the mean vehicle height $\overline{H}$ calculated in step S122 is the target vehicle height (normal vehicle height). If YES in step S123, i.e., it is determined that it is the reference vehicle height, and decides that the control is performed in suitable delay time, and advances to step S101.

On the other hand, if NO in step S123, and hence the mean vehicle height is determined to be unequal to the reference vehicle height in step S122, the flow advances to step S124, and it is determined whether the mean vehicle height is lower than the reference height. If YES in step S124, i.e., it is determined that the mean vehicle height is lower than the reference vehicle height, the flow advances to step S125, subtracts the value of the above-mentioned unit time memory "t" from the value of the time memory "Tb", and sets "Tb−t38 in the same time memory "Tb". Then, "Tb" is set in the above-mentioned delay time T(N) in step S126. In other words, if the mean vehicle height is determined to be lower than the reference vehicle height, the delay time T(N) is shortened, to accelerate the time for starting the attitude control from when the operating lever is operated. In the next position control, it is corrected to bring the timing of change in the position of the vehicle body occurred at the shifting time of the transmission with that of controlling the position.

If NO in step S124, i.e., it is determined that the mean vehicle height is higher than the reference vehicle height, the flow advances to step S127, and "Tb+t" is set to the time memory "Tb". Then, the "Tb" is set in the above-mentioned delay time T(N). In other words, it is determined that the mean vehicle height is higher than the reference vehicle height, thereby delaying the time for starting the position control from when the operating lever is operated by increasing the delay time T(N), and it is corrected to bring the timing of change in the position of the vehicle body occurred by the shifting of the transmission with that of controlling the position.

When the parking brake is disengaged to start the vehicle, it is necessary to perform the control reversely to the control performed in the above step S116 or S118. Thus, the process after the step S128 is executed. In other words, when the parking brake is disengaged to start the vehicle, "NO" is determined in step S103. Therefore, the flow advances to step S128, and it is determined whether or not the flag N is "1". If YES in step S128, i.e., it is determined that the flag N is "1", and the flow advances to step S129, and controls to lower the rear end of the vehicle body. Thus, the valves marked "o" of "Rear Down" mode in the vehicle height controlling mode in FIG. 12 are opened during Tc(1) sec. in the step S129, thereby exhausting compressed air of the set amount from the chambers 103 of the units RS1, RS2 of the rear wheel side to lower the rear wheel side of the vehicle body. Therefore, the floating of the rear end of the vehicle body due to the reaction when the vehicle is started (moved forward) can be negated to substantially prevent the change in the position of the vehicle body. Thus, the pressures of the chambers 103 of the units RS1, RS2 return to the original state.

If NO in step S128, the flow advances to step S130, and it is determined whether or not the flag N is "3". If YES in step S130, i.e., it is determined that the flag N is "3". Then, the flow advances to step S131, and it is controlled to raise the rear end of the vehicle body. In other words, the valves marked with "o" in "Rear Up" mode in the vehicle height controlling mode of FIG. 12 are opened during Tc(3) sec. in the step S131, thereby supplying compressed air of the set amount from the tank 115a to the chambers 103 of the units RS1, RS2 to raise the rear end of the vehicle body. Therefore, the sink of the rear end of the vehicle body due to the reaction when the cause of the floating of the rear end of the vehicle body is eliminated by starting (reversely moving) the vehicle can be negated to substantially prevent the sinking of the rear end of the vehicle body, and the the pressure of the chambers 103 of the rear suspension units RS1, RS2 returns to the original state.

Then, when the control of these steps S129 or S131 is finished, it is already not necessary to control, and the flow advances to step S132, and the flag N is set to "0".

If NO in step S130, it is also not necessary to control, and the flow returns to step S101.

Therefore, according to the fourth embodiment of the invention, the same advantages as those of the first embodiment can be provided, and the following advantages can also be provided. In the fourth embodiment, after the control is executed in step S116 or S118, the mean vehicle height during 0.45 sec. is calculated after the control in step S121 and S122, it is then compared with the calculated mean vehicle height in steps S123, S124, and further delay time of control is corrected in step S126, S127. Therefore, when this process is repeated several times, the timing of the change in the position of the vehicle body occurred in the shifting of the transmission is advantageously optimized with that of controlling the position.

In the embodiments described above, air spring chambers are used as fluid spring chambers in the suspension apparatus. However, the present invention may be applied to other types of suspension apparatuses. For instance, the embodiments of the invention can also be applied to the suspension apparatus of hydropneumatic type in the same manner as the above-mentioned embodiments.

In the embodiments described above, the supply or exhaust of air to the air spring chambers of rear wheel side or from the air spring chambers of the rear wheel side are performed by controlling the position at the time of shifting the transmission during stopping. However, the supply or exhaust of air to the air spring chambers or from the air spring chambers can be performed at the front wheel side as required. In this case, the supply or exhaust of air to the air spring chambers or from the air spring chambers of the front wheel side must be necessarily performed reversely to the control of the rear wheel side.

What is claimed is:

1. A vehicle suspension apparatus in a motor vehicle having an automatic transmission comprising:
   suspension units comprising fluid spring means containing means for housing a fluid for supporting at least the rear wheels of the vehicle;
   fluid supply means including fluid supply control valves for controlling the supply of the fluid to the fluid spring means;
   fluid exhaust means including fluid exhaust control valves for controlling the supply of the fluid away from the fluid spring means;
   parking brake detecting means operatively connected to the parking brake and comprising means for detecting whether the parking brake is engaged or disengaged, and means for transmitting a signal to a control means indicating whether the parking brake is engaged or disengaged;

shift position detecting means operatively connected to the automatic transmission and comprising means for detecting the shift position of the automatic transmission, and means for transmitting a signal to the control means indicating the shift position of the automatic transmission, said automatic transmission including a fluid drive unit for transmitting a drive force to the wheels of the vehicle; and control means comprising means for receiving and analyzing the signals from the parking brake detecting means and the shift position detecting means, and means for selectively transmitting a control start signal to thereby open the fluid supply control valve or the fluid exhaust control valve for a preselected period of time, wherein when the parking brake detecting means detects that the parking brake is engaged and the shift position means detects that the automatic transmission has shifted from a park or neutral position to a forward or reverse position thereby tending to produce a displacement of the vehicle, the fluid in the fluid spring means is adjusted during the preselected period of time by the opening of the fluid supply control valve or the fluid exhaust control valve to thereby elongate or contract the fluid spring means to thereby negate the tendency of the vehicle to undergo displacement.

2. The apparatus of claim 1 further comprising a vehicle velocity detecting means comprising means for detecting the velocity of the vehicle and means for transmitting a signal to the control means indicating the velocity of the vehicle, and wherein when the velocity of the vehicle as detected by the vehicle velocity detecting means exceeds a set value, the control means prevents the transmission of the control start signal to the fluid supply control valve and the fluid exhaust control valve.

3. The apparatus of claim 2 further comprising a pressure detecting means operatively connected to the automatic transmission and comprising means for detecting the line pressure in the automatic transmission for controlling the reduction gear ratio and means for transmitting a signal to the control means indicating the line pressure of the automatic transmission, wherein when the line pressure as detected by the pressure detecting means exceeds a set value, the control means prevents the transmission of the control start signal to the fluid supply control valve and the fluid exhaust control valve.

4. The apparatus according to claim 1 wherein the control means further comprises means for transmitting a control return signal to the fluid supply control valve or the fluid exhaust control valve to thereby selectively open one of said valves during a preselected time until the pressure of the fluid in the fluid spring means supporting the rear wheels is substantially the same as the pressure in said fluid spring means prior to the transmission of the control start signal by the control means, said control means transmitting said control return signal after the parking brake detecting means transmits a signal to the control means indicating that the parking brake is disengaged.

5. The apparatus according to claim 1 wherein the control means further comprises means for transmitting a control return signal to the fluid supply control valve or the fluid exhaust control valve to thereby selectively open one of said valves during a preselected time until the pressure of the fluid in the fluid spring means supporting the rear wheels is substantially the same as the pressure in said fluid spring means prior to the transmission of the control start signal by the control means, said control means transmitting said control return signal after the shift position detecting means transmits a signal to the control means indicating that the automatic transmission has shifted from the forward or reverse position to the park or neutral position.

6. The apparatus of claim 2 wherein the control means further comprises means for transmitting a control return signal to the fluid supply control valve or the fluid exhaust control valve to thereby selectively open one of said valves for a preselected period of time until the pressure of the fluid in the fluid spring means supporting the rear wheels is substantially the same as the pressure in said fluid spring means prior to the transmission of the control start signal by the control means, said control means transmitting said control return signal after the vehicle velocity detecting means transmits a signal to the control means indicating that the velocity of the vehicle has exceeded said set value.

7. The apparatus of claim 1 wherein the control means comprises a microcomputer.

8. The apparatus of claim 1 further comprising means associated with said control means for delaying the transmission of the control start signal for a set delay time corresponding to an estimate of the time extending from when the automatic transmission is shifted from one position to another position to the time when the shifting results in a change in height of the vehicle, wherein said control means transmits the control start signal after the parking brake detecting means transmits a signal to the control means indicating that the parking brake is engaged and after the shift position detecting means transmits a signal to the control means indicating that the automatic transmission has shifted from a park or neutral position to a forward or reverse position, and after the expiration of the set delay time.

9. The apparatus of claim 8 further comprising a vehicle height detecting means comprising means for detecting the height of the rear wheel side of the vehicle and means for transmitting a signal to the control means indicating the height of the rear wheel side of the vehicle, said control means further comprising means for adjusting the set delay time by a set unit of time, means for calculating the mean vehicle height of the vehicle for a set time during which the fluid level in the fluid spring means is adjusted in response to the signals received from the vehicle height detecting means, and means for comparing the mean vehicle height to a vehicle reference height, wherein the set delay time is shortened by the set unit of time when the control means determines that the mean vehicle height calculated during said set time is lower than the vehicle reference height and wherein the set delay time is lengthened by the set unit of time when the control means determines that the means vehicle height calculated during said set time is greater than the vehicle reference height.

10. A vehicle suspension apparatus in a motor vehicle having an automatic transmission comprising:

suspension units comprising fluid spring means containing means for housing a fluid for supporting the wheels of the vehicle;

fluid supply means including fluid supply control valves for controlling the supply of the fluid to the fluid spring means;

fluid exhaust means including fluid exhaust control valves for controlling the supply of the fluid away from the fluid spring means;

parking brake detecting means operatively connected to the parking brake and comprising means for detecting whether the parking brake is engaged or disengaged, and means for transmitting a signal to a control means indicating whether the parking brake is engaged or disengaged;

shift position detecting means operatively connected to the automatic transmission and comprising means for detecting the shift position of the automatic transmission and means for transmitting a signal to the control means indicating the shift position of the automatic transmission, said automatic transmission including a fluid drive unit for transmitting a drive force to the wheels; and control means comprising means for receiving and analyzing the signals from the parking brake detecting means and the shift position detecting means, and means for selectively transmitting a control start signal to thereby open the fluid supply control valve or the fluid exhaust control valve of the suspension units for supporting the rear wheels for a preselected period of time, wherein when the parking brake detecting means detects that the parking brake is engaged and the shift position detecting means detects that the automatic transmission has shifted from a park or neutral position to a forward or reverse position thereby tending to produce a displacement of the vehicle, the fluid in the fluid spring means is adjusted during the preselected period of time by the opening of the fluid supply control valve or the fluid exhaust control valve to thereby elongate or contract the fluid spring means to thereby negate the tendency of the vehicle to undergo displacement.

11. The apparatus of claim 10, wherein said fluid supply means comprises:

supply path selecting means including at least one large and one small diameter pathway for supplying fluid to said fluid spring means;

said control means further comprising means for comparing a reference vehicle height with the vehicle height detected by a vehicle height detecting means, said apparatus further comprising;

said vehicle height detecting means comprising means for detecting the height of the vehicle and means for transmitting a signal to the control means indicating the height of the vehicle;

vehicle height control means comprising means for selecting a reference vehicle height, means for selecting the small diameter pathway of said path selecting means, and means for simultaneously controlling the opening of predetermined supply or exhaust control valves to theeby control the vehicle height in a direction so that the vehicle height detected by the vehicle height detecting means coincides with the reference vehicle height when both the vehicle height detected by said vehicle height detecting means and the reference vehicle height are compared by said control means and found to be different;

position change detecting means comprising means for detecting the change in the position of the vehicle body and means for transmitting a signal to the control means indicating a change in position of the vehicle body; and vehicle position control means comprising means for selecting the large diameter pathway of said path selecting means and means for simultaneously opening the supply control valve of the contracted fluid spring means and the exhaust control valve of the elongated fluid spring means in response to the change in the position of the vehicle as detected by said position change detecting means, and wherein said control means selects the small diameter pathway of said path selecting means simultaneously upon initiating the control start signal.

12. The apparatus of claim 10, wherein said fluid supply means further comprises:

supply path selecting means including at least one large and one small diameter pathway for supplying fluid to said fluid spring means, and wherein said fluid exhaust means further comprises:

exhaust path selecting means including at least one large and one small diameter pathway for exhausting fluid away from said fluid spring means, said control means further comprising means for comparing a reference vehicle height with a vehicle height detected by a vehicle height detecting means, said apparatus further comprising:

vehicle height detecting means comprising means for detecting the height of the vehicle and means for transmitting a signal to the control means indicating the height of the vehicle height;

vehicle height control means comprising means for selecting a reference vehicle height, means for selecting the small diameter pathway by said path selecting means, and means for simultaneously controlling the opening of predetermined supply or exhaust control valves to thereby control the vehicle height in a direction so that the vehicle height detected by the vehicle height detecting means coincides with the reference vehicle height when both the vehicle height detected by said vehicle height detecting means and the reference vehicle height are compared by said control means and found to be different;

position change detecting means comprising means for detecting a change in the position of the vehicle body and means for transmitting a signal to the control means indicating the change in the position of the vehicle body, and vehicle position control means comprising means for selecting the large diameter pathway by said path selecting means and means for simultaneously opening the supply control valve of the contracted fluid spring means and the exhaust control valve of the elongated fluid spring means in response to the change in the position of the vehicle as detected by said position change detecting means, and wherein said control means selects the small diameter path by said path selecting means simultaneously upon initiating the control start signal.

13. A vehicle suspension apparatus in a motor vehicle having an automatic transmission comprising:

suspension arms extending longitudinally of the vehicle body for supporting at least one of the front and rear wheels operatively connected to the vehicle body;

fluid spring means operatively connected to a suspension unit for supporting at least the rear wheels;

fluid supply means for supplying fluid to said fluid spring means of the suspension unit for supporting the rear wheels;

fluid exhaust means including fluid exhaust control valves for exhausting fluid away from said fluid spring means of the suspension unit and for supporting the rear wheels;

parking brake detecting means operatively connected to the parking brake and comprising means for detecting whether the parking brake is engaged or disengaged and means for transmitting a signal to a control means indicating whether the parking brake is engaged or disengaged;

foot brake detecting means operatively connected to the foot brake and comprising means for detecting whether the foot brake is engaged or disengaged and means for transmitting a signal to the control means indicating whether the foot brake is engaged or disengaged;

shift position detecting means operatively connected to the automatic transmission and comprising means for detecting the shift position of the automatic transmission and means for transmitting a signal to the control means indicating the shift postion of the automatic transmission, said automatic transmission including a fluid drive unit for transmitting a drive force to the wheels of the vehicle;

said control means comprising means for receiving and analyzing the signals from the parking brake detecting means, the foot brake detecting means and the shift position detecting means, and means for selectively transmitting a control start signal to thereby open the fluid supply control valves or the fluid exhaust control valve for a preselected period of time, wherein when the parking brake detecting means detects that the parking brake is engaged and the shift position detecting means detects that the automatic transmission has shifted from a park or neutral position to a forward or reverse position thereby tending to produce a displacement of the vehicle, the fluid in the fluid spring means is adjusted during the preselected period of time by opening of the fluid supply control valve or the fluid exhaust control valve to thereby elongate or contract the fluid spring means to theeby negate the tendency of the vehicle to undergo displacement and wherein, said control means further comprises means for preventing the transmission of the control start signal when the control means receives the signal from the foot brake detecting means indicating that the foot brake is engaged.

14. The apparatus of claim 13, wherein the suspension arm comprises a trailing arm.

15. The apparatus of claim 13, wherein the suspension arm comprises a leading arm.

16. A vehicle suspension apparatus in a motor vehicle having an automatic transmission comprising:

fluid spring means provided at each suspension unit for supporting the wheels of the vehicle, said fluid spring means containing means for housing a fluid;

fluid supply means including fluid supply control valves for controlling the supply of the fluid to the fluid spring means;

fluid exhaust means including fluid exhaust control valves for controlling the supply of the fluid away from the fluid spring means;

parking brake detecting means operatively connected to the parking brake and comprising means for detecting whether the parking brake is engaged or disengaged, and means for transmitting a signal to a control means indicating whether the parking brake is engaged or disengaged;

shift position detecting means operatively connected to the automatic transmission and comprising means for detecting the shift position of the automatic transmission and means for transmitting a signal to the control means indicating the shift position of the automatic transmission, said automatic transmission including a fluid drive unit for transmitting a drive force to the wheels;

said control means comprising means for receiving and analyzing the signals from the parking brake detecting means and the shift position detecting means and means for transmitting a control start signal, said fluid spring means becoming elongated upon receiving fluid from the fluid supply means and said fluid spring means beconing contracted when the fluid is taken away from the fluid spring means by the fluid exhaust means, wherein said control means transmits a control start signal to thereby open the supply control valve of the contracted fluid spring means and the exhaust control valve of the elongated fluid spring means in response to the change in the position of the vehicle when the parking brake detecting means detects that said parking brake is engaged and the shift position detecting means detects that the shift position of said automatic transmission is shifted from the park or neutral position to a forward or reverse position.

* * * * *

UNITED STATES PATENT AND TRADEMARK OFFICE
CERTIFICATE OF CORRECTION

PATENT NO. : 4,669,750
DATED : June 2, 1987
INVENTOR(S) : Tadao Tanaka et al.

It is certified that error appears in the above—identified patent and that said Letters Patent is hereby corrected as shown below:

Please change the name of the third inventor from "Tasutaka Taniguchi" to read --Yasutaka Taniguchi--.

Column 17, line 22, before "means" insert --detecting--.

Column 18, line 62, delete "means" and insert --mean--.

Column 19, line 59, delete "theeby" and insert --thereby--.

Column 21, line 48, delete "theeby" and insert --thereby--.

Signed and Sealed this

Twenty-seventh Day of October, 1987

Attest:

DONALD J. QUIGG

Attesting Officer

Commissioner of Patents and Trademarks